United States Patent [19]

Watanabe

[11] Patent Number: 4,484,199

[45] Date of Patent: Nov. 20, 1984

[54] METHOD AND APPARATUS FOR DETECTING FAILURE OF AN INK JET PRINTING DEVICE

[75] Inventor: Masato Watanabe, Hachioji, Japan

[73] Assignee: Konishiroku Photo Industry Co., Ltd., Japan

[21] Appl. No.: 473,654

[22] Filed: Mar. 9, 1983

[30] Foreign Application Priority Data

Mar. 30, 1982 [JP] Japan .................... 57-53389
Apr. 8, 1982 [JP] Japan .................... 57-59351

[51] Int. Cl.$^3$ .................... G01D 21/00
[52] U.S. Cl. .................... 346/1.1; 346/140 R
[58] Field of Search .................... 346/140, 75, 1.1

[56] References Cited

U.S. PATENT DOCUMENTS 3,562,761 2/1971 Stone .................... 346/75
4,067,019 1/1978 Fleischer .................... 346/75
4,323,905 4/1982 Reitberger .................... 346/75

*Primary Examiner*—Joseph W. Hartary
*Attorney, Agent, or Firm*—Finnegan, Henderson, Farabow, Garrett & Dunner

[57] ABSTRACT

A method of determining failure of an ink jet printing apparatus in which a plurality of ink droplets are jetted from each of the nozzles of the ink jet printing apparatus in succession toward a receiving electrode. The ink droplets are electrically charged as they travel toward the receiving electrodes, and a waveform signal which is the summation of the signals developed by each of the particles is used to determine whether the ink jet printing apparatus is functioning properly. An apparatus is also disclosed for determining whether the ink jet printing apparatus is functioning properly and includes charging electrodes in close proximity to jetting nozzles of an ink jet printing head and adapted to electrically charge ink droplets jetted from the nozzles as they travel toward a receiving electrode. Intermediate electrodes which are maintained at constant potential are positioned between the charging electrodes and the receiving electrode and serve to increase the magnitude of the signal imposed upon the receiving electrode.

4 Claims, 18 Drawing Figures

METHOD AND APPARATUS FOR DETECTING FAILURE OF AN INK JET PRINTING DEVICE

BACKGROUND OF THE INVENTION

The present invention relates to ink jet printing, and more particularly to an apparatus and method for detecting whether or not ink droplets are being properly jetted from the nozzles of a printing head.

Ink jet printing apparatus of the type to which the present invention relates are disclosed in Japanese Patent Publication Nos. 12138/1978, 39495/1976, and 45698/1978. These publications disclose ink jet printing apparatus wherein ink droplets are jetted from a plurality of nozzles in response to electrical signals applied to piezoelectric crystal elements to cause pulses in pressure chambers associated with the nozzles.

On demand ink jet printing apparatus of this type sometimes fails to properly jet ink droplets from the nozzles. The reason for this is that the nozzle orifices become blocked by air bubbles in the printing head, or become partially obstructed or clogged by dust, dirt or other foreign particles, or by dried ink, particularly if the printing head is not used for some time. When this occurs, printing quality suffers either because the ink droplets miss their target or because some are not jetted at all. In that event, it is necessary that the blocked or clogged orifices be cleaned so that proper performance is restored to the printing head.

In the past, it often has been necessary to visually inspect the nozzle orifices and to witness the printing produced thereby to determine whether the nozzle orifices are clear. Also, the corrective action necessary to clear the orifices and restore the printing head to proper operation has, in the past, required manual labor. This is troublesome and time consuming. Devices have been proposed to carry out this procedure without visual inspection and manual labor, but these devices, in many instances, fall short of producing satisfactory results.

It is, therefore, a main object of this invention to overcome the problems and shortcomings of the prior art and to provide a method and an apparatus for accurately determining when an ink jet device has failed, as described above.

It is also an important object of this invention to provide such a method and apparatus whereby the necessary corrective action can be performed easily and automatically to restore the device to proper operation.

The accompanying drawings which are incorporated in and constitute a part of this specification, illustrate embodiments of the invention and, together with the description, serve to explain the principles of the invention.

DETAILED DESCRIPTION

Reference will now be made in detail to the present preferred embodiments of the invention, examples of which are illustrated in the accompanying drawings.

Jetting failure detecting devices of the type to which the present invention relates are of the electric charge capacity counter type. This type of jetting failure detecting device includes charging electrodes arranged in the vicinity of the discharge nozzles of a printing head, a receiving electrode arranged opposite the ink orifices of the nozzles, and a circuit for detecting the trajectory of charged ink droplets toward the receiving electrode. With this type of device it becomes possible to detect jetting failure without requiring visual inspection.

Figure 1:
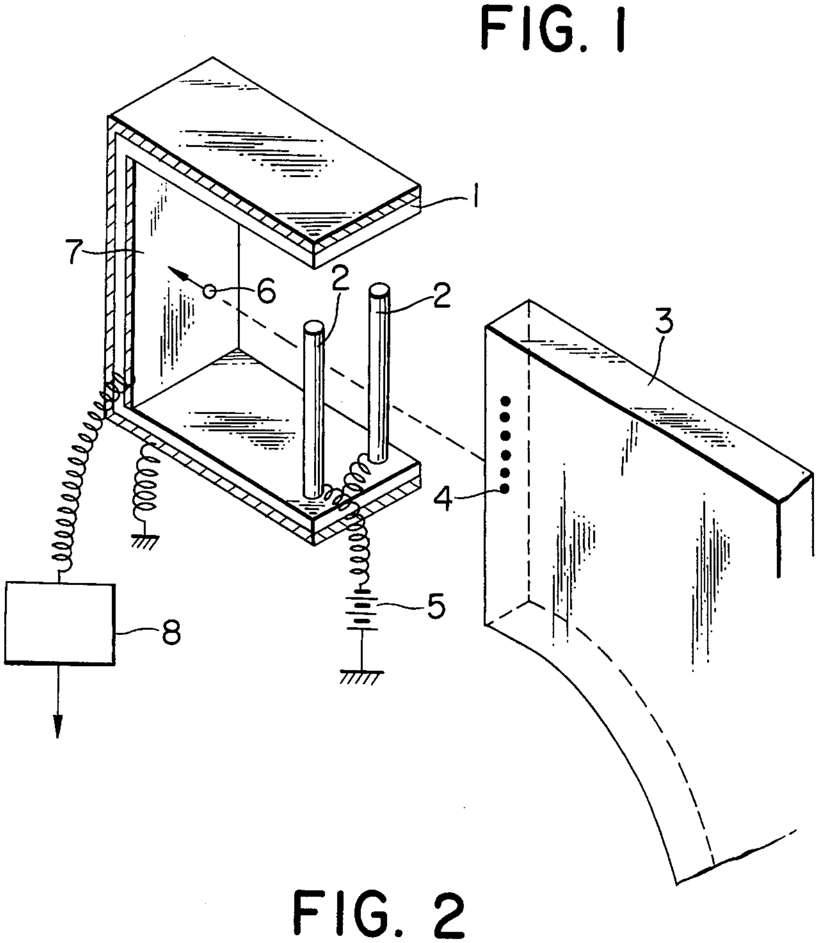
FIG. 1 is a perspective view showing a prior art apparatus for determining jetting failure in an ink jet printing device.

This type of device is shown in FIG. 1 and includes a U-shaped base plate 1 which is an insulating member. A pair of charging electrodes 2,2 are mounted on the base 1 and are disposed close to a plurality of nozzles 4 on a printing head 3. A negative voltage is applied to the electrodes 2,2 by a DC power source 5.

Figure 2:
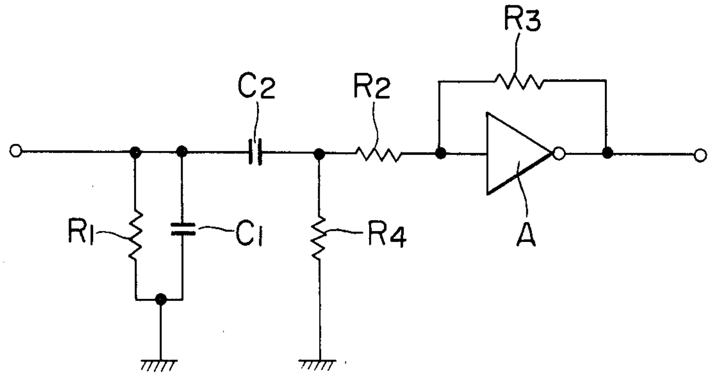
FIG. 2 is a diagram of a detecting circuit utilized in the apparatus of FIG. 1.

Ink droplets 6 jetted from the nozzles 4 have a charge $+Q_0$ imparted to the surface thereof as they pass electrodes 2,2. A receiving electrode 7 mounted on the base plate 1 obtains a charge $-Q_1$ when each ink droplet 6 strikes it. The charge $-Q_1$ is then converted into an electric signal by means of a detecting circuit 8 which, as shown in FIG. 2, includes a charging/discharging circuit comprising a resistor $R_1$ and a capacitor $C_1$, a differentiating circuit comprising a resistor $R_4$ and capacitor $C_2$, and an amplifier circuit comprising an inversion amplifier A and resistors $R_2$, $R_3$. Detecting circuit 8 puts out a detection signal every time an ink droplet 6 strikes the receiving electrode 7.

Figure 3:
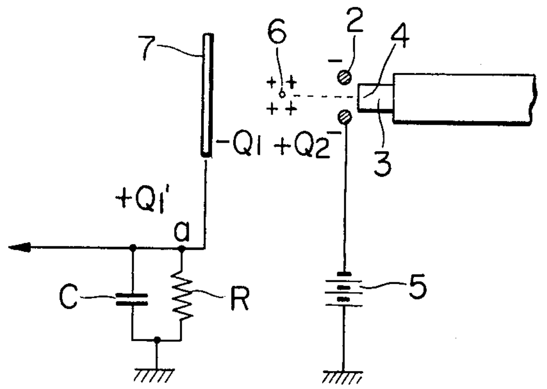
FIG. 3 is a view similar to FIG. 2 showing an equivalent circuit and a schematic representation of the structure of FIG. 1.

Reference will now be made to FIG. 3 which depicts an equivalent circuit of that of FIG. 2 and a schematic of the structure of FIG. 1. When an ink droplet 6 charged at $+Q_0$ approaches the receiving electrode 7, a charge $-Q_1$ is generated at the receiving electrode 7 by electrostatic induction and a charge $+Q'_1$ is generated at the terminal a of detection resistor R. As the next ink droplet 6 similarly charged approaches the receiving electrode 7, the charge generated at the receiving electrode 7 increases from $-Q_1$ to $-Q_2$ and at the same time the charge generated at the terminal a of detection resistor R increases from $+Q'_1$ to $+Q'_2$.

Figure 4:
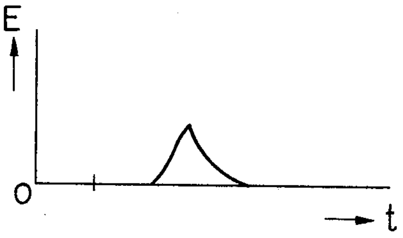
FIG. 4 is a waveform diagram of a signal developed from ink droplet jetted by the structure of FIG. 3.

The charge generated at the end a of the detection resistor R varies inversely with the second power of the distance between ink droplets 6 and the receiving electrode 7 so that the rate of increase of the electric charge increases as each ink droplet 6 gets closer to the electrode 7. In other words, the observed current i (which equals dq/dt) appears as a flow into detection resistor R while the current is increased. In this case, resistance R is fixed so that output voltage E becomes a waveform in proportion to the current i as a result of the equation $E=iR$. This detection signal wave form is shown in FIG. 4 wherein t is the time of travel for particle 6 from the charging electrodes 2,2 to the receiving electrodes 7, and E is the output voltage of circuit 8.

When the ink droplet 6 strikes the receiving electrode 7, the charge at terminal a of detection resistor R stops increasing so that the observed current i becomes 0. However, the detection signal does not become zero immediately because of capacitor C parallel to detection resistor R which has a charge $Q=CE$ applied thereto. This charge is discharged through resistor R so that the discharge waveform drops to 0 as shown in FIG. 4.

Figure 5:
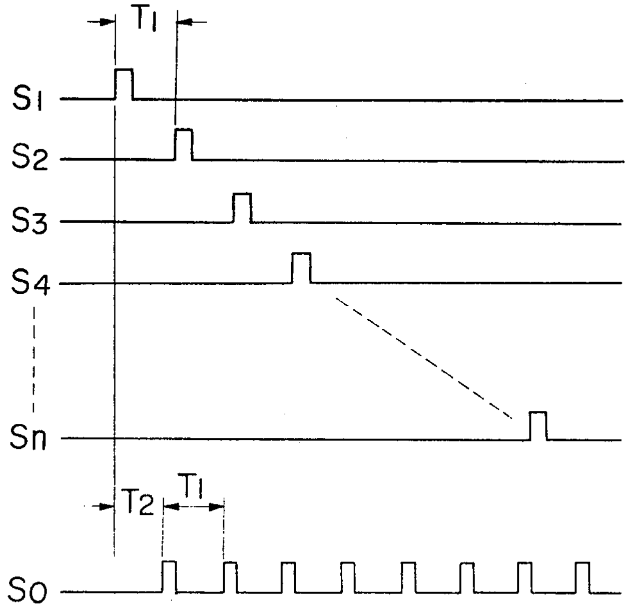
FIG. 5 is a diagram showing rectangular pulse waveforms developed from the signals of FIG. 4.

The detection signal is then aligned by a Schmitt circuit (not shown) to become a rectangular pulse waveform which is input to a microcomputer (not shown). As shown in FIG. 5, a series of rectangular pulse waveforms $S_1$, $S_2$, $S_3$, $S_4$, . . . $S_n$ are developed by droplets jetted from respective ones of the nozzles 4 of the printing head 3.

Figure 6:
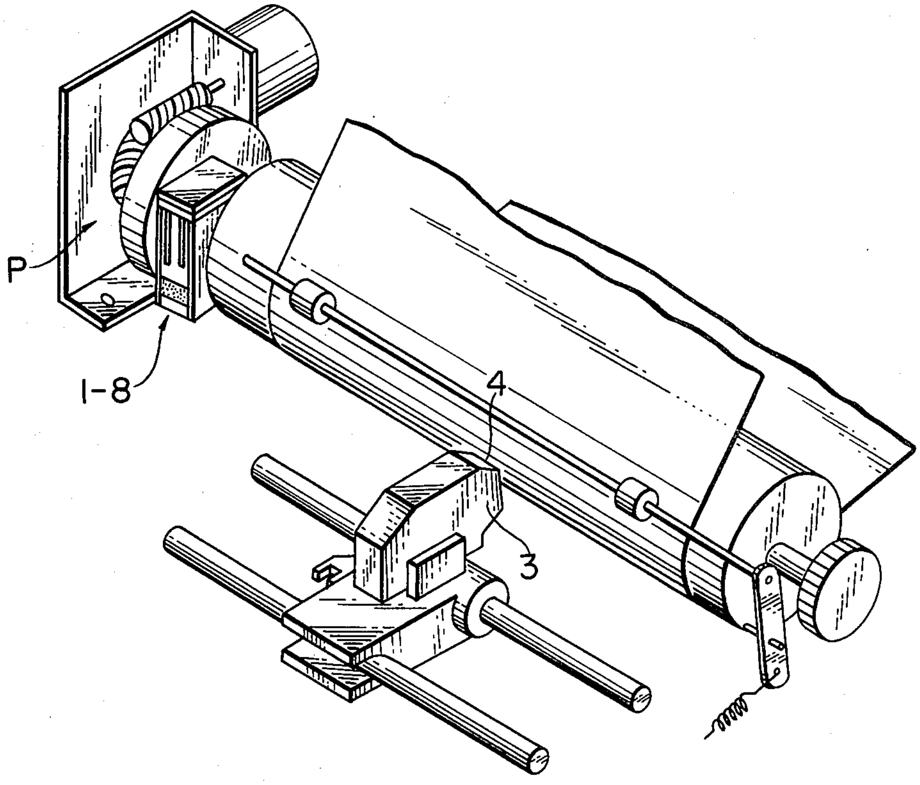
FIG. 6 is a perspective view illustrating a portion of an ink jet printing apparatus in which the present invention is used.

Referring now to FIG. 6, the printing head 3 is adapted to scan back and forth over a long paper during the printing process. The printing head 3 also is movable to a test station represented by the designation "1–8" which includes the structure of FIG. 1. At this station, ink droplets 6 are jetted from the several nozzles 4 in the manner described above with fixed time intervals $T_1$ therebetween (FIG. 5). If a jetting failure is detected, which appears as a missing rectangular wave form, the printing head 3 is moved to a purging station P where ink is forceably jetted from the printing head 3 to remove the impairment, i.e., air bubbles, dried ink, etc. The printing head 3 is then returned to the printing position to resume normal operation.

The rectangular wave forms $S_1$, $S_2$, $S_3$, $S_4$, . . . $S_n$ are delivered from the microcomputer to the driving circuit of the ink jet printing apparatus as n ink droplets 6 are jetted from a corresponding number of nozzles 4, as described above. The ink droplets 6 are jetted and the pulse signals so developed at fixed time intervals $T_1$ are fed to the microcomputer (FIG. 5). $T_2$ represents the time lag between the wave forms and the corresponding pulse signals developed thereby. If one or more of the nozzles 4 misfires or does not fire at all, a corresponding one or ones of the pulse signals $S_0$ will be missing. This can be compared, for example, with a signal requiring that all of the pulse signals $S_O$ occur so that if the two signals are not in complete agreement, a signal indicating a jetting failure of one or more of the nozzles 4 is given. Alternatively, the number of the signals $S_O$ can be counted and if that number does not match the number of nozzles 4, a jetting failure signal is given. The jetting failure signal then is used to cause the printing head 3 to move to the purging station P and the nozzles 4 to be cleared in the manner described above.

It will be appreciated that in the aforesaid jetting failure detecting devices, the level or intensity of detection signals for jetted ink droplets is a function of the following factors.

(1) The electric charge applied to the ink droplets by the charging electrodes: The electric charge so applied depends, inter alia, upon the diameter or surface area of the ink droplets 6; the electric conductivity of the ink; the voltage applied to the charging electrodes 2,2; the distance from the printing head 3 to the charging electride 2,2; and the space or gap between the electrode needles of charging electrodes 2,2.

(2) Jetting speed of the ink droplets 6: The jetting speed is varied, inter alia, by varying the voltage and waveform of the pulse signals for driving the piezoelectric crystal elements (not shown) which are arranged in the printing head 3, by varying the temperature of the ink, etc.

(3) Distance between the charging electrodes and the receiving electrode: The smaller this distance is, the higher the level of the resulting detection signal becomes.

(4) Constants of the detection circuit: The detection circuit 8 comprises resistors $R_1$, $R_2$, $R_3$, $R_4$ and capacitors $C_1$ and $C_2$. Therefore, the detection signal level can be varied by selecting suitable constants of R and C, respectively, for these elements.

Careful consideration of the above "factors", particularly the relation between the diameter of ink droplets 6 and the electric charge of the ink droplets, can result in improved performance of an ink jet failure detecting device. However, it will be appreciated that these ink jet devices are often characterized by high-speed performance, a wide range of printing outputs, low noise, and use of plain paper. Further, ink jet printing apparatus of this type should be able to deliver ink droplets the size of which can be selected freely so that it is possible to jet droplets 6 of very small diameters on a sheet of recording paper.

Thus, it is desirable that such devices have their printing quality improved by using droplets of relatively small size. This is particularly true when printing Chinese characters, figures and the like. The printing quality and resolution of such devices can be improved in nearly all cases by using smaller diameter ink droplets.

One of the problems which arises when using small diametered ink droplets with conventional jetting failure detecting devices is that the level of electric charge which can be applied to the ink droplets 6 by the charging electrodes 2,2 is small so that the level of the detection signal level is correspondingly reduced rendering the detection of jetting failure inaccurate. (See "factor" 1 above). To compensate for this, it has been attempted to vary the other "factors" described above but this approach has met with little success.

The method of the present invention overcomes this problem by providing an improved method for detecting ink jetting failure characterized in that a plurality of pulses are applied in succession to each nozzle of an ink jet printing head. According to the method of this invention, a plurality of driving pulses are successively applied to each jetting channel which includes a nozzle, a pressure chamber and a piezoelectric crystal element, so that a corresponding number of ink droplets are jetted successively from each nozzle. In this manner, the diameter and the surface area of the jetted ink droplets are added together and produce an electric charge and resulting detection signal is representative of a larger droplet size. This allows for accurate detection of jetting failure even for very small sized droplets.

Figure 7:
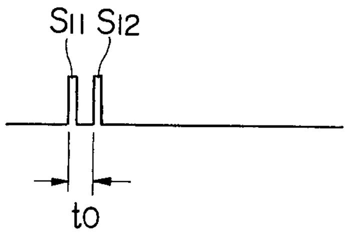
FIG. 7 is a diagram showing rectangular waveform pulse signals which are generated in the method of the present invention.
Figure 8:
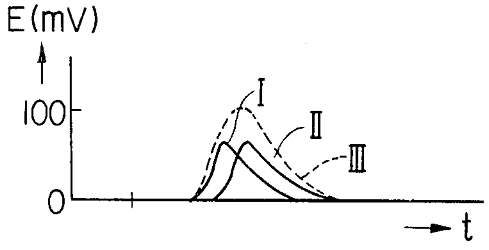
FIG. 8 is a waveform diagram of signals developed by jetted ink droplets in accordance with the method of the present invention.
Figure 9:
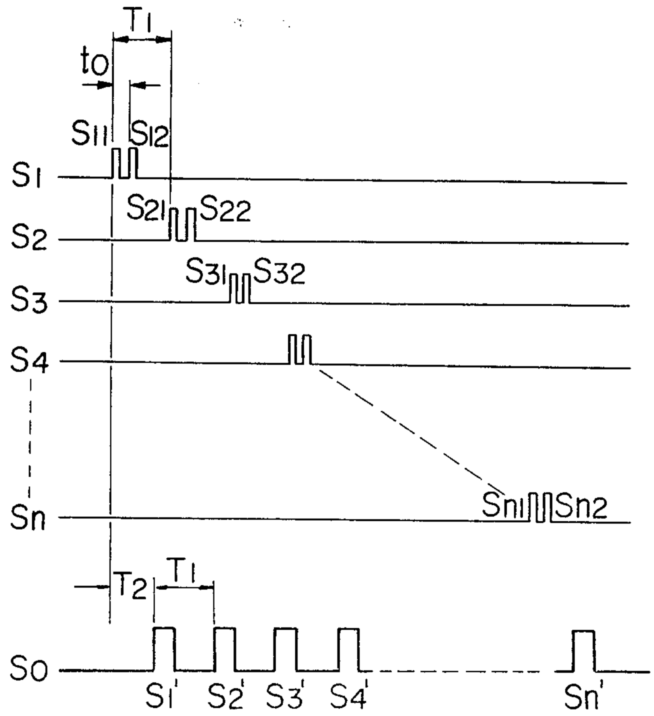
FIG. 9 is a diagram showing rectangular pulse waveforms developed from the signals of FIG. 8.

The jetting failure detecting method of this invention is illustrated in FIGS. 7–9. A waveform diagram illustrating a plurality of driving pulse signals to be applied to recording head 3, with the purpose of jetting successive ink droplets at the time when testing for a jetting failure, is shown in FIG. 7. An initial pulse signal $S_{11}$ is applied to the printing head driving circuit, for example, through a microcomputer forming part of the ink jet printing apparatus. This causes an ink droplet 6 to be jetted from nozzle 4. When the droplet 6 passes between the charging electrodes 2,2, it is electrically charged so that as it approaches the receiving electrode 7, a detection signal is developed by detection circuit 8 in the form of a curve I shown in FIG. 8.

A second droplet 6 is then jetted from nozzle 4 and causes a second pulse signal $S_{12}$ to be applied to the driving circuit after a given period of time to, e.g., 500 ms, so that a detection signal in the form of curve II shown in FIG. 8 is developed by circuit 8. By adding these two detection signals depicted by curves I and II, it is possible to obtain a composite signal waveform shown in the form of curve III. It will be observed that the detection output voltage of composite curve III can reach a much higher value, for example, 100 mv, while the voltage of curves I and II may only reach 60 mv. The composite voltage signal is then used to determine whether there has been a jetting failure.

It will be understood that the foregoing describes a procedure for the determination of jetting failure in a single nozzle, but that the same principles apply when determining jetting failure in a plurality of nozzles. In that case, pulse signals developed by successive ink droplets jetted from a plurality of nozzles develop waveforms, $S'_1$, $S'_2$, $S'_3$, $S'_4 \ldots S'_n$ within fixed periods of time $T_1$, e.g., 7 ms, by means of a microcomputer and the driving circuit of an ink jet printing apparatus (see FIG. 9). In this illustration, there are n ink jetting channels each having an associated nozzle. The signals in the waveforms comprise a plurality of pulses, $S_{11}$ and $S_{12}$, $S_{21}$ and $S_{22}$, $S_{31}$ and $S_{32}$, ... $S_{n1}$ and $S_{n2}$, so that the detection circuit 9 will output n composite detection signals at fixed intervals $T_1$. The composite detection signals then are aligned by, for example, a conventional Schmitt circuit (not shown) and converted to rectangular waveform pulse signals $S_0$ and then fed to a microcomputer. In FIG. 9, T2 represents the time lag between pulses $S_1$, $S_2$, $S_3$, $S_4 \ldots S_n$ and the signals $S_0$, developed thereby. Should there be a missing pulse signal $S_0$, it is easily determined that a jetting failure has occurred and, in fact, which nozzle has failed so that the necessary corrective action can be taken.

The method of the present invention can be carried out using microcomputer software so that it is relatively easy and reliable to perform. Also, it is possible to change the number of ink droplets 6 successively jetted from each of the nozzles to obtain even higher signal voltages.

By the method of the present invention, it has become possible to detect precisely jetting failure caused by air bubbles, dirt, and/or dried ink in ink jet printing apparatus using micro minimized ink droplets.

Figure 10:
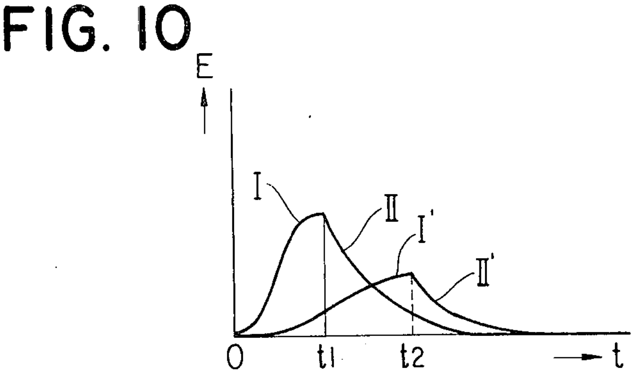
FIG. 10 is a view similar to FIG. 4 showing a comparison between signals developed from jetted ink droplets for different distances between electrodes 2,2 and electrode 7.
Figure 11:
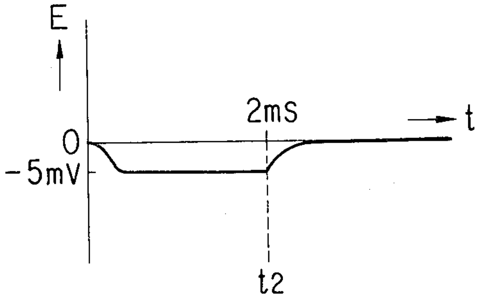
FIG. 11 is a diagram showing a signal waveform developed from the signal of FIG. 10.

Another and related aspect of this invention relates to an improved jetting failure detecting apparatus. It will be appreciated that when the distance between electrodes 2,2 and electrode 7 (FIG. 1) is increased, the travel time for the ink droplet 6 between these points also increases. The waveforms developed by jetted ink droplets 6 in devices having different distances between electrodes 2, 2, and electrode 7 is illustrated in FIG. 10. As shown there, curve I–II represents a shorter distance between electrodes 2,2 and electrode 7 and consequently a shorter time $t_1$ for passage of the droplet 6 between these points. Curve I′–II″ represents a longer distance and a corresponding longer time $t_2$. As expected, as the distance between the electrodes 2,2 and electrode 7 increases, the magnitude of the detection signal decreases. FIG. 5 shows the signal waveform obtained from curve I′–II″ for the increased distance between electrodes.

From the "factors" discussed above, it will be appreciated that a higher signal level is obtained by decreasing the gap between electrodes 2,2 and electrode 7. Problems which can occur here are that the charging electrodes 2,2 must be closely disposed to the nozzles 4 and if electrodes 2,2 and electrode 7 are insufficiently shielded from each other, as would arise in a very small gap between them, then these electrodes may be influenced by outside noise. Second, the detection signal can be influenced by high DC voltage applied to the charging electrodes 2,2 when the gap is too small. Third, the electrodes can be short circuited by the presence of dust and/or abnormalities in the ink droplets causing the detecting circuit 8 to be destroyed. Thus, simply positioning the electrodes 2,2 and electrode 7 closer together is unsatisfactory.

In accordance with the present invention, it has been determined that providing a pair of intermediate electrodes between the charging electrode 2,2 and the receiving electrode 7 close to the path of ink particles results in the following advantages.

1. The intermediate electrodes produce an increased detection signal level without changing the gap between the charging electrodes and the receiving electrode since the receiving electrode is exposed to a charge only after the particles pass through the intermediate electrodes.

2. Noise created by changes in the DC voltage applied to the charging electrodes is substantially eliminated.

3. The receiving electrode can readily be shielded from static electricity.

Figure 12:
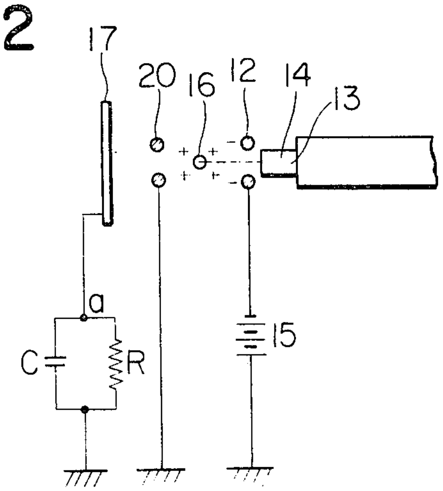
FIG. 12 is a view similar to FIG. 3 schematically illustrating the apparatus of the present invention.

The apparatus embodying this invention described briefly above is diagrammatically illustrated in FIG. 12. As shown there, a pair of charging electrodes 12,12 are arranged in close proximity to nozzles 14 on printing head 13. The electrodes 12,12 are impressed with a negative voltage from a DC power source 15. when an ink particle 16 is jetted from the nozzle 14, a charge of $+Q_1$ is applied to its surface. As the ink droplet 16 moves toward a receiving electrode 17, it passes between a pair of intermediate electrodes 20,20 which are maintained at a relatively constant potential or are connected to ground. The intermediate electrodes 20,20 are located in close proximity to the path followed by the ink jet particles 16.

When ink droplet 16 is jetted from a nozzle 14 and passes between electrodes 12,12, a charge of $+Q_1$ is impressed on the droplet surface. When the droplet 16 passes between the intermediate electrodes 20, the receiving electrode 17 is for the first time impressed with a charge $-Q_1$ as a result of static induction. Simultaneously a charge $+Q'_1$ is accumulated at the terminal a of detection resistor R. Subsequently, as the charged ink droplet 16 more closely approaches electrode 17, the charge accumulated at the terminal a of resistor R increases from $+Q'_1$ to $+Q'_2$. As previously described, the charge accumulated at terminal a of the detection resistor R is inversely proportional to the square of the distance between the jetted ink droplet 16 and the receiving electrode 17 so that this charge increases at a relatively high rate as the ink droplet 16 approaches the electrode 17. Furthermore, the gap between electrode 17 and the electrode 20,20 can be made very small so that the detection signal level can be made relatively large.

Figure 13:
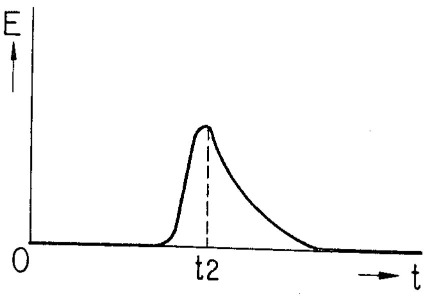
FIG. 13 is a view similar to FIG. 10 showing the signal developed by the apparatus of the present invention.
Figure 14:
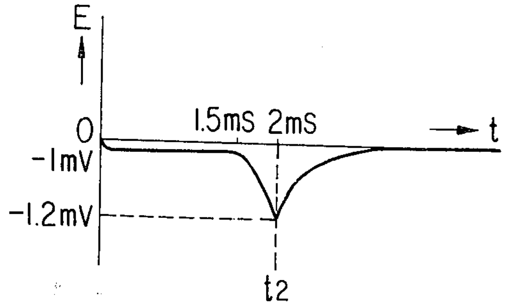
FIG. 14 is a view similar to FIG. 11 showing the signal waveform developed from the signal of FIG. 13.

FIG. 13 is a diagram showing the developed output voltage E which occurs at the terminal a of the detection resistor R, in accordance with the present invention, wherein the output voltage E rises throughout a time period $t_2$ at which time the ink droplet 16 strikes the receiving electrode 17. FIG. 14 is a diagram showing the development of output voltage at the detection signal level. The diagrams of FIGS. 13 and 14 are based upon data obtained in experiments carried out under the following conditions.

| | |
|---|---|
| Distance between electrodes 12 and 20 | 4.5 mm |
| Distance between intermediate electrodes 20,20 and receiving electrode 17 | 1.5 mm |
| Distance between charging electrodes 12 | 1.6 mm |
| Distance between intermediate electrodes 20,20 | 1.6 mm |
| DC power source voltage | 350 V |
| Time required for ink droplet 16 jetted from nozzle 14 to arrive at receiving electrode 17 | 2 ms |
| Resistivity of resistor $R_1$ | 10 M |
| Electric capacity of condenser $C_1$ | 50 PF |

Figure 15:
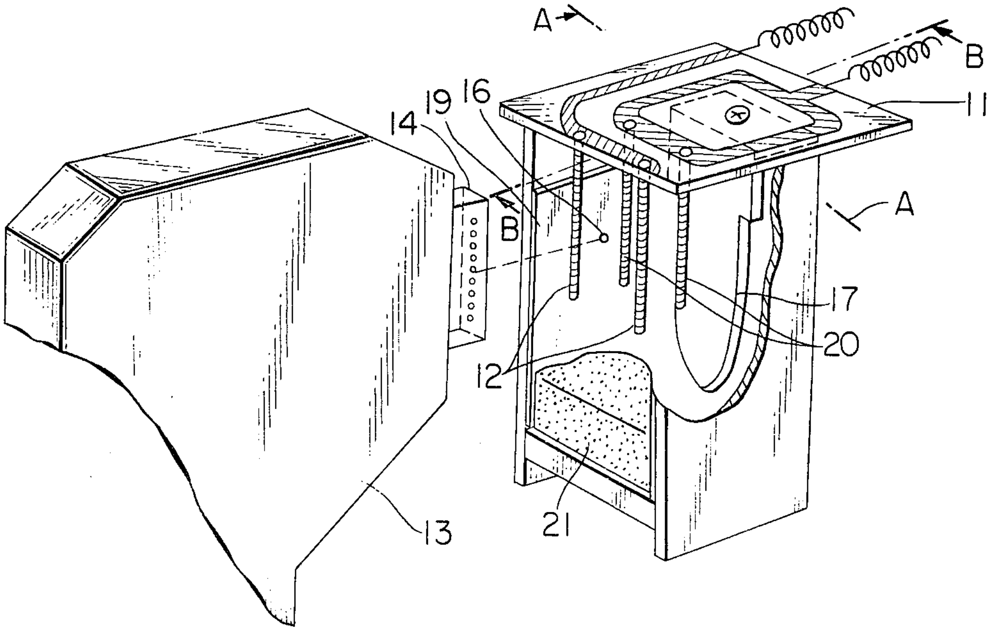
FIG. 15 is a perspective view similar to FIG. 1 showing the apparatus of the present invention.
Figure 16:
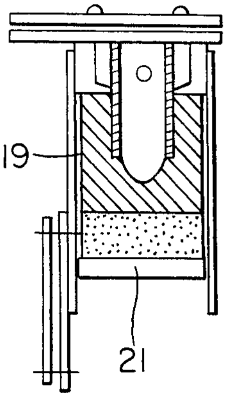
FIG. 16 is a sectional view of FIG. 15 taken along the line A—A thereof.
Figure 17:
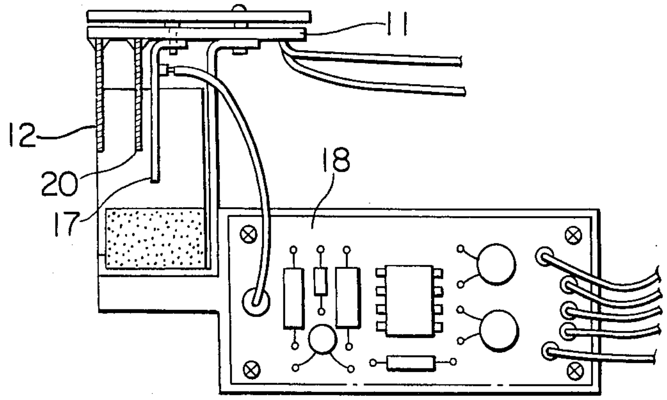
FIG. 17 is a sectional view of FIG. 15 taken along the line B—B thereof.

FIG. 15 is a perspective view showing the construction of the invention schematically illustrated in FIG. 12. FIGS. 16 and 17 are front and side cross sectional view, respectively, of the structure of FIG. 15. As shown in these figures, the baseplate 11 has charging electrodes 12,12, intermediate electrodes 20,20 and receiving electrode 17 mounted thereon. A static shielding member 19 encloses the electrodes 12, 17 and 20 on three sides and is connected to ground. Ink droplets 16, which are jetted from the nozzles 14 of the printing head 13, pass between the charging electrodes 12,12 and the intermediate electrodes 20,20 and thereafter strike the receiving electrode 17. After that, the ink droplets 16 fall onto an ink absorbing member 21, e.g., a sponge, and are absorbed thereby.

When the ink jet failure detecting device of the present invention is used with the ink jet printing apparatus depicted in FIG. 6, the printing head 13 is moved to a misjet detection position at predetermined intervals, e.g., every 90 seconds, and ink droplets are jetted successively at a fixed time interval from each of the nozzles 14. The misjet detection position is the same as that shown at the left of FIG. 6 and depicted by "1–8". When the printing head 13 is in the position where the nozzles 14 align with the misjet detection device, ink droplets 16 are jetted from the nozzles 14 on printing head 13. Droplets 16 pass between the charging electrodes 12,12, the intermediate electrodes 20,20 and strike the receiving electrode 17, as described above, and then fall downwardly and are absorbed by the absorbing member 21. At the same time, an electric charge is impressed on the receiving electrode 17 and produces a voltage in the charge/discharge circuit 18 as described above. The corresponding output signal of the detection circuit 18 becomes a pulse signal which is representative of the number of ink droplets 16 delivered from the nozzles 14.

Figure 18:
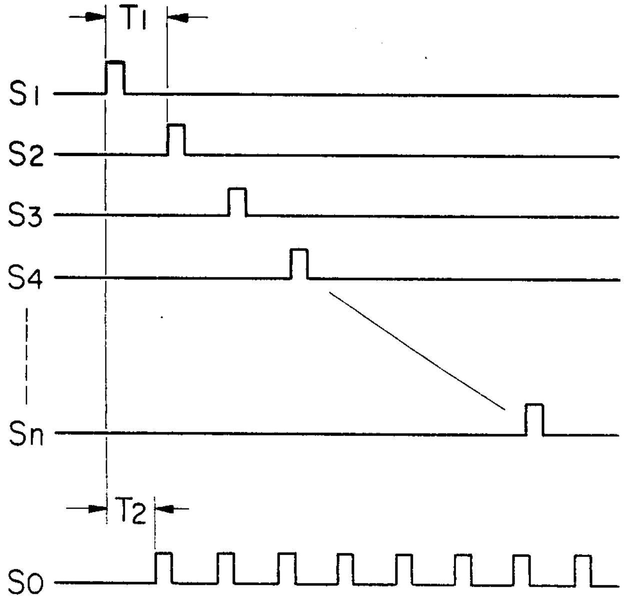
FIG. 18 is a diagram showing rectangular pulse waveforms developed from the signals of FIG. 13.

As shown in FIG. 18, pulse signals $S_1, S_2, S_3, S_4, \ldots S_n$ are impressed to ink droplets 16 which are successively jetted from corresponding nozzles 14 at time intervals $T_1$, e.g., 5 ms. The signals generated when the ink droplets 16 strike the receiving electrode 17 are shown in FIG. 18 at $S_0$ and follow the pulse signals by a time interval $T_2$. Accordingly, a missing pulse in the output signal of the detection circuit 18 represents a jetting failure at one or more of the nozzles 14.

In this regard, means can be provided to detect missing pulse signals in the output signal of the detection circuit 18. Such means may provide that a jet dispatching signal transmitted at the time of misjet detection is a reference signal and a misjet signal occurs whenever inconsistency is found in the reference signal when compared with the output signal of the detection circuit 18. Alternatively, the output signal of the detection circuit 18 can be transmitted during the time of detection and a misjet signal occurs whenever the counted value of signals does not reach the predetermined number.

In this embodiment, the charging electrodes 12,12 and the intermediate electrodes 20,20 can be formed by a pair of straight needle-like electrodes or by ring-like or U-shaped electrodes through which the ink droplets 16 pass. Furthermore, the receiving electrode 17, the base plate 11 and the static shielding member 19 need not be limited to the particular forms and shapes which are illustrated in this embodiment.

The misjet detecting device of the present invention can exhibit a highly beneficial effect when it is incorporated in demand type ink jet printing apparatus which are used in ink jet printer facsimile devices and the like having single and multiple nozzles.

It will be understood that various modifications and variations of the invention may be made without departing from the spirit of the invention. For example, the invention lies in the method and apparatus by which electric charge is measured by applying an electrostatic charge to ink droplets but is also applicable to other detecting methods and apparatus such as a photoelectric detecting device used to detect the presence or absence of dots by reflection or transmission of light, or a method and apparatus which is sensitive to temperature change caused by presence (or absence) of ink droplets.

It will be understood further that other additions, substitutions, modifications and omissions may be made to this invention, and that these additions, substitutions, modifications and omissions are included in this invention provided they fall within the confines of the appended claims and their equivalents.

What is claimed is:

1. A method of detecting failure of an ink jet printing device to properly jet ink droplets from the nozzles thereof comprising the steps of providing an ink jet head having a plurality of nozzles and a receiving electrode adapted to be struck by the droplets jetted from said nozzles, causing a plurality of pulses to be applied in succession to each of said nozzles causing a corresponding plurality of ink droplets to be jetted successively from each said nozzle, causing each of said droplets to be electrically charged during passage thereof from said nozzles to said electrode.

2. The method claimed in claim 1, including the step of generating a waveform signal in response to electric charge applied to said electrode from each of said droplets striking said electrode, said waveform signals being formed by adding together the waveform signals from each of said plurality of successive ink droplets.

3. A device for detecting failure of an ink jet printing head, said device comprising a printing head provided with a plurality of ink jet nozzles, a receiving electrode disposed opposite said nozzles for receiving ink droplets jetted from said nozzles, a pair of charging electrodes arranged in close proximity to said nozzles and adapted to electrically charge said particles as they pass therebetween, and a pair of intermediate electrodes between said charging electrodes and said receiving electrode between which said ink droplets pass, said intermediate electrodes being maintained at a constant electrical potential.

4. An apparatus as claimed in claim 3, said intermediate electrodes being connected to ground.

* * * * *